United States Patent
Iwatsuka

(10) Patent No.: US 6,621,630 B2
(45) Date of Patent: Sep. 16, 2003

(54) COMPOSITE OPTICAL ELEMENT, OPTICAL ISOLATOR, OPTICAL ATTENUATOR AND PROCESSES FOR PRODUCING THEM

(75) Inventor: Shinji Iwatsuka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/823,118

(22) Filed: Mar. 30, 2001

(65) Prior Publication Data

US 2001/0032940 A1 Oct. 25, 2001

(30) Foreign Application Priority Data

Mar. 30, 2000 (JP) .................................. 2000-093530

(51) Int. Cl.⁷ .................... G02B 5/30; G02B 27/28; H01S 3/00
(52) U.S. Cl. .................... 359/484; 359/494; 359/497; 372/703
(58) Field of Search ................. 359/484, 494, 359/495, 497, 499, 500; 372/703

(56) References Cited

U.S. PATENT DOCUMENTS

| 5,499,307 A | * 3/1996 | Iwatsuka | 359/494 |
| 5,812,304 A | * 9/1998 | Shirasaki et al. | 359/281 |
| 6,130,778 A | * 10/2000 | Iwatsuka et al. | 359/484 |
| 6,359,733 B1 | * 3/2002 | Iwatsuka et al. | 359/484 |

FOREIGN PATENT DOCUMENTS

| JP | 63055501 | 3/1988 | |
| JP | 2156205 | 6/1990 | |
| JP | 5181088 | 7/1993 | |
| JP | 6051255 | 2/1994 | |
| JP | 11-002725 | * 1/1999 | G02B/5/30 |

* cited by examiner

*Primary Examiner*—Georgia Epps
*Assistant Examiner*—Alicia M Harrington
(74) *Attorney, Agent, or Firm*—Drinker Biddle & Reath LLP

(57) ABSTRACT

An optical element comprises a Faraday rotator and first, second, third, and fourth birefringent regions. The first and second regions and a fifth region are joined to one plane of the rotator. The third and fourth regions and a sixth region are joined to the opposite place of the rotator. Light that has passed through the first region passes through the third region. Light that has passed through the second region passes through the fourth region. The optical axes of the first and second regions intersect orthogonally. The optical axes of the third and fourth regions intersect orthogonally. The principal planes of the first and second regions have the same ground surfaces. The principal planes of the third and fourth regions have the same ground surfaces. The first through fourth regions are of the same material. At most 10% of the light beam travels through the fifth and sixth regions.

32 Claims, 11 Drawing Sheets

Step 1

Step 2

Step 3

Cutting

13

Step 4

Polishing

13 → 14

FIG.7
Step 6
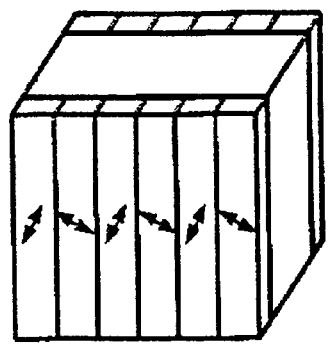
FIG.8
Step 7
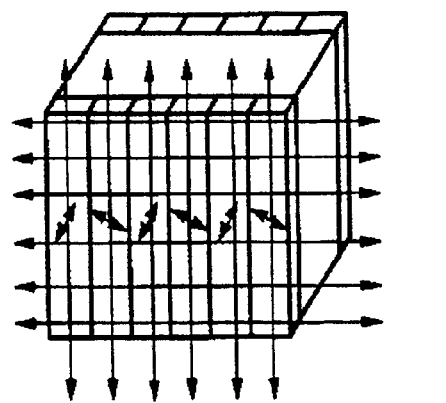  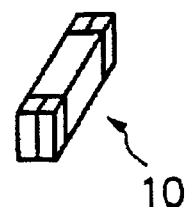

COMPOSITE OPTICAL ELEMENT, OPTICAL ISOLATOR, OPTICAL ATTENUATOR AND PROCESSES FOR PRODUCING THEM

FIELD OF THE INVENTION

This invention relates to composite optical elements, optical isolators, and optical attenuators for applications in optical communications and optical measurements, and also to processes for producing the same.

BACKGROUND OF THE INVENTION

Japanese Patent Application Kokai No. 11-2725 describes a composite optical element comprising a Faraday rotator and at least a first and a second birefringent regions joined to one plane of the rotator, with or without at least a third and a fourth birefringent regions joined to the opposite plane of the rotator, and also describes optical isolators, optical circulators, and optical switches utilizing such optical elements. In order to achieve a desired optical isolation or the like, it is essential that the first and second birefringent regions and, where provided, the third and fourth birefringent regions should be precisely equal in thickness. According to the cited teachings, the first and second birefringent regions are made by: first forming grooves in plate materials, equidistantly in parallel with one another to a predetermined depth by etching or other similar method, leaving ridges or lands in between; the grooved sides of the plate materials are faced to each other, with the grooves and lands of one side being fitted in the lands and grooves of the other, and joined integrally with the aid of adhesive; and then the both outer sides of the joined body are machined to the bottoms of the grooves and finished by polishing. The cited method is effective in strictly equalizing the thicknesses of the first and second birefringent regions so joined. The same applies to the joining of the third and fourth birefringent regions.

Adoption of a birefringent element thus made renders it possible to fabricate an optical isolator, for example, a polarization-independent optical isolator as a composite optical element comprising a Faraday rotator with a Faraday rotation angle of 45° (although it is common to add an external magnetic field, spontaneous magnetization sometimes takes place in the absence of a magnetic field), at least a first and a second birefringent regions joined to one side of the rotator, and at least a third and a fourth birefringent regions joined to the opposite side of the rotator, wherein:

the light that has been transmitted through the first birefringent region passes through the third birefringent region;

the light that has been transmitted through the second birefringent region passes through the fourth birefringent region;

the optical axis of the first birefringent region and that of the second birefringent region intersect orthogonally;

the optical axis of the third birefringent region and that of the fourth birefringent region intersect orthogonally;

the optical axis of the first birefringent region and that of the third birefringent region make an angle of about 45° with respect to each other;

the both principal planes of the first and second birefringent regions have the same surfaces flush with each other;

the both principal planes of the third and fourth birefringent regions have the same surfaces flush with each other; and the first, second, third, and fourth birefringent regions are of the same material quality and have the same thickness d. Thus all light beams in the forward direction pass through the composite element without dependence upon the direction of polarization, whereas return light beams are all diffracted without dependence upon the polarization direction and are unable to return to the incident side.

The principles of the optical isolator described in the cited literature are as follows.

Out of the light beams incoming in the forward direction, the light of linear polarization parallel to the optical axis of the first birefringent region is transmitted as extraordinary light (refractive index ne) through the first birefringent region. As it further passes through the Faraday rotator the plane of polarization rotates 45°, and then the light passes as ordinary light (refractive index no) through the third birefringent region. [The optical path length is (ne+no)d]. Meanwhile light as ordinary light (refractive index no) is transmitted through the second birefringent region. As it further passes through the Faraday rotator the plane of polarization rotates 45°, and then the light passes as extraordinary light through the fourth birefringent region. [The optical path length is (no+ne)d].

Of the light incoming in the forward direction, light of linear polarization perpendicular to the optical axis of the first birefringent region passes as ordinary light through the first birefringent region. As it further passes through the Faraday rotator the plane of polarization rotates 45°, and then the light passes as extraordinary light through the third birefringent region. [The optical path length is (no+ne)d]. It then travels as extraordinary light through the second birefringent region and, after 45° rotation of the polarized surface by the Faraday rotator, it passes as ordinary light through the fourth birefringent region. [The optical path length is (no+ne)d]. Thus all the optical paths are equal in length and light travels straightly forward without diffraction.

Of the light incident from the reverse direction, the light of linear polarization parallel to the optical axis of the third birefringent region is transmitted as extraordinary light through the third birefringent region. As it further passes through the Faraday rotator the plane of polarization rotates 45°, and then the light passes as ordinary light through the first birefringent region. [The optical path length is (ne+ne) d]. Meanwhile light as ordinary light is transmitted through the fourth birefringent region. As it further passes through the Faraday rotator the plane of polarization rotates 45°, and then the light passes as extraordinary light through the second birefringent region. [The optical path length is (no+no)d]. Here if d is set so that the optical path difference is $2(no-ne)d=(M+\frac{1}{2})\lambda$ (where $\lambda$ is the wavelength of the light and M is an arbitrary integer), light will all be diffracted.

Of the light incident from the reverse direction, the light of linear polarization perpendicular to the optical axis of the third birefringent region is transmitted as ordinary light through the third birefringent region. As it further passes through the Faraday rotator the plane of polarization rotates 45°, and then the light passes as ordinary light through the first birefringent region. [The optical path length is (no+no) d]. Meanwhile light as extraordinary light is transmitted through the fourth birefringent region. As it further passes through the Faraday rotator the plane of polarization rotates 450, and then the light passes as extraordinary light through the second birefringent region. [The optical path length is (ne+ne)d]. Here because the optical path difference is $2(no-ne)d=(M+\frac{1}{2})\lambda$ (where $\lambda$ is the wavelength of the light and M is an arbitrary integer), light will all be diffracted.

According to the method of Patent Application Kokai No. 11-2725, as illustrated in FIG. 1, a composite optical element is fabricated by disposing a first birefringent region 1 and a second birefringent region 2 on one side of a Faraday rotator 7 and disposing a third birefringent region 3 and a fourth birefringent region 4 on the other side of the rotator and joining them through layers of adhesive 8. The arrangement necessarily forms a fifth region 5 and a sixth region 6 of the adhesive used, in addition to the two birefringent regions each on both sides of the Faraday rotator, resulting in deteriorated optical properties. The problem arises from the fact that a blank sheet of birefringent material must be formed with a sufficient number of grooves to make a plurality of composite optical elements and, in order to bring the two grooved sheets of birefringent material face to face and into mesh with each other, adequate clearances must be provided between the grooves and lands in mesh, resulting in the formation of relatively large fifth and sixth regions.

The present invention is aimed at solving the above problem and providing composite optical elements with stabilized optical properties and also providing processes for producing the same.

SUMMARY OF THE INVENTION

The problem of the prior art can be solved by the following means according to the present invention.

(1) The invention provides a composite optical element comprising a Faraday rotator, a first birefringent region, a second birefringent region, and a fifth region, all said three regions being joined to one plane of said rotator, and a third birefringent region, a fourth birefringent region, and a six region, all said three regions being joined to the opposite plane of said rotator, the light that has been transmitted through the first birefringent region passing through the third birefringent region, the light that has been transmitted through the second birefringent region passing through the fourth birefringent region, the optical axis of the first birefringent region and that of the second birefringent region intersecting orthogonally, the optical axis of the third birefringent region and that of the fourth birefringent region intersecting orthogonally, the principal planes of both the first and second birefringent regions having the same ground surfaces, the principal planes of both the third and fourth birefringent regions having the same ground surfaces, the first, second, third, and fourth birefringent regions being of the same material, and the percentage of travel of the light beam through the fifth and six regions being no more than 10%.

(2) The invention preferably provides the above composite optical element wherein the refractive indexes of the fifth and sixth regions have values between the refractive indexes of the birefringent regions with respect to ordinary light and extraordinary light.

(3) The invention also provides a process for producing the composite optical element (1) which comprises joining a plurality of a first birefringent plates and a plurality of a second birefringent plates alternately with adhesive to form a laminate, meanwhile joining numbers of third and fourth birefringent plates alternately with adhesive to form a laminate, cutting the laminates into pieces each of which is the composite optical element, the joints formed using the adhesive constituting a fifth and a sixth regions.

(4) The invention desirably provides the process (3), wherein the refractive index of the adhesive used in alternately joining the birefringent plates into a laminate has a value between the refractive indexes of the birefringent material with respect to ordinary light and extraordinary light.

(5) The invention desirably provides the process (3), wherein only two different birefringent plates are used to form the laminate of the first and second birefringent plates and the laminate of the third and fourth birefringent plates.

(6) The invention desirably provides the process (3), wherein the positional relations of the four different birefringent regions can be decided without adjustment, through control of the thickness of the birefringent plates to be the same.

(7) The invention further provides a composite optical element comprising a Faraday rotator, a first birefringent region and a second birefringent region joined to one plane of said rotator, and a third birefringent region and a fourth birefringent region joined to the opposite plane of said rotator, the light that has been transmitted through the first birefringent region passing through the third birefringent region, the light that has been transmitted through the second birefringent region passing through the fourth birefringent region, the optical axis of the first birefringent region and that of the second birefringent region intersecting orthogonally, the optical axis of the third birefringent region and that of the fourth birefringent region intersecting orthogonally, the principal planes of both the first and second birefringent regions having the same ground surfaces, the principal planes of both the third and fourth birefringent regions having the same ground surfaces, the first, second, third, and fourth birefringent regions being of the same material, and the first and second birefringent regions and the third and fourth birefringent regions are each joined by optical contact.

(8) The invention also provides an optical isolator comprising a composite optical element (1), (2), or (7), which further comprises at least one lens and one optical fiber arranged on each of the two sides of the composite optical element. A magnetic field is applied by a magnet to the Faraday rotator of the composite optical element, but the magnet is not needed when a material that spontaneously magnetizes itself is used in the Faraday rotator.

(9) The invention further provides an optical isolator comprising the composite optical element of (1), (2), or (7), and at least one optical fiber arranged on each of the two sides of the composite optical element. As for the means of magnetizing the Faraday rotator, the same as (8) above applies.

(10) The invention preferably provides the isolator (9), wherein the optical fibers are arranged in a capillary and the composite optical element is fitted in a groove formed in the capillary.

(11) The invention further provides an optical attenuator comprising at least a composite optical element and magnetic field-applying means, said optical element comprising a Faraday rotator, a first birefringent region and a second birefringent region joined to one plane of said rotator, and a third birefringent region and a fourth birefringent region joined to the opposite plane of said rotator, the light that has been transmitted through the first birefringent region passing through the third birefringent region, the light that has been transmitted through the second birefringent region passing through the fourth birefringent region, the optical axis of the first birefringent region and that of the second birefringent region intersecting orthogonally, the optical axis of the third birefringent region and that of the fourth birefringent region intersecting orthogonally, the principal planes of both the first and second birefringent regions having the same ground surfaces, the principal planes of both the third and fourth birefringent regions having the same ground surfaces, the first, second, third, and fourth birefringent regions being of the same material, and said magnetic field-applying means being one capable of applying a variable magnetic field to said Faraday rotator.

(12) The invention provides the attenuator (11), which further comprises at least one lens and one optical fiber arranged on each of the two sides of said composite optical element.

(13) The invention also provides the attenuator (11), which further comprises at least one optical fiber arranged on each of the two sides of said composite optical element.

(14) The invention preferably provides the attenuator (11), wherein the optical fibers are arranged in a capillary and the composite optical element is fitted in a groove formed in the capillary.

(15) The invention provides the isolator (8), (9), or (10), wherein said composite optical element is located as inclined to the optical axis of incident light.

(16) The invention provides the attenuator (11), (12), (13), or (14), wherein said composite optical element is located as inclined to the optical axis of incident light.

(17) The invention further provides the isolator (15), wherein said composite optical element is located as inclined to the optical axis of incident light, and the plane including said optical axis and normal of the plane of incidence of said composite optical element is parallel to the interfacial boundary between said first and second birefringent regions.

(18) Thus the invention further provides the isolator (17), wherein the interfacial boundary between said first and second birefringent regions and the interfacial boundary between said third and fourth birefringent regions are on the same plane.

(19) The invention also provides the attenuator (16), wherein said composite optical element is located as inclined to the optical axis of incident light, and the plane including said optical axis and normal of the plane of incidence of said composite optical element is parallel to the interfacial boundary between said first and second birefringent regions.

(20) The invention also provides the attenuator (19), wherein the interfacial boundary between said first and second birefringent regions and the interfacial boundary between said third and fourth birefringent regions are on the same plane.

The attenuators (19), (20) are directly applicable to the embodiment of optical isolator described with reference to FIG. 15, in which case, however, a variable magnetic field-applying means becomes necessary.

(21) The invention also provides an optical attenuator comprising the composite optical element (1), (2), or (7), magnetic field-applying means, and at least one lens and one optical fiber arranged on each of the two sides of said composite optical element.

(22) The invention also provides an optical attenuator comprising the composite optical element (1), (2), or (7), magnetic field-applying means, and at least one optical fiber arranged on each of the two sides of said composite optical element.

(23) The invention further provides the (22), wherein the optical fibers are arranged in a capillary and the composite optical element is fitted in a groove formed in the capillary.

With regard to (21), (22), and (23) above, the constructions described in connection with optical isolators can be utilized as they are by simply modifying the variable magnetic field-applying means.

BRIEF EXPLANATION OF THE DRAWINGS

FIG. 7 is a view illustrating Step 6 of an exemplary process for manufacturing an optical isolator of the invention;

FIG. 8 is a view illustrating Step 7 of an exemplary process for manufacturing an optical isolator of the invention;

DETAILED DESCRIPTION OF THE INVENTION

Figure 1A:
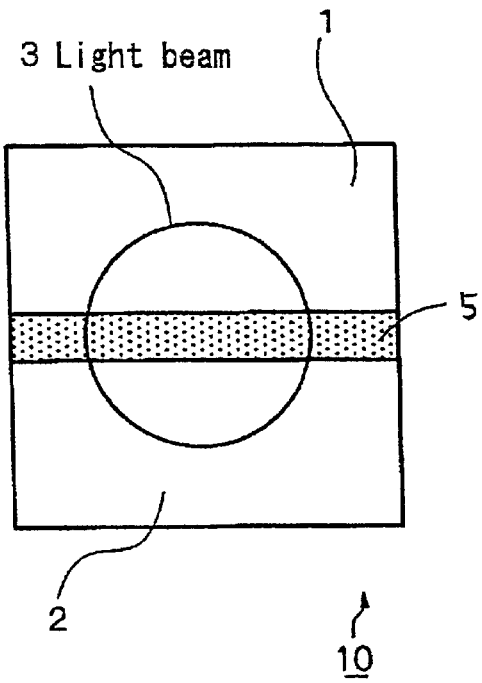
FIG. 1 shows explanatory views of a prior art composite optical element.

The present invention will now be described as embodied in an optical isolator.

With the composite optical element defined in (1) above, the percentage of light beam that passes through the fifth and sixth regions are limited to 10% or less. The limitation is a means of stabilizing its isolation (reverse direction loss) characteristics. This will be more concretely explained below.

The light that has been transmitted in the reverse direction through the third birefringent region, Faraday rotator, and first birefringent region (percentage transmission k1, phase δ1) and the light that has been transmitted in the reverse direction through the fourth birefringent region, Faraday rotator, and second birefringent region (percentage transmission k2, phase δ2)

do not travel straight as the phases are preset to be 180° apart (as noted above, optical path length=|2(ne−no)d|=λ/2).

In the mean time, the light that has been transmitted through the six region, Faraday rotator, and fifth region (percentage transmission k3, phase δ3) goes straight in the absence of phase (optical path length) control. It is this straightly traveling light that deteriorates the isolation characteristics. Ordinarily, with an optical isolator, at least 20 dB isolation is believed to be necessary. Restricting the percentage transmission of a light beam through the fifth and sixth regions to no more than 10% renders it possible to attain at least 20 dB isolation.

This can be expressed by the following representation:

The transmissivity of the light traveling straight in the reverse direction is $|k1xe^{i\delta 1}k2xe^{i\delta 2}k1xe^{i\delta 3}|^2$. If k1=k2 and |δ1−δ2|=180°, then the transmissivity is $|k3|^2$. Thus if k3≦0.1, the transmissivity≦0.01, and hence the isolation (reverse direction loss)≧20 dB.

A composite optical element of such a construction can hardly be obtained by the conventional method; to obtain it the process of the invention must be used.

In (2) above, the refractive index of the fifth and sixth regions is set between the refractive indexes with respect to ordinary light and extraordinary light of those birefringent regions. The setting is for the sake of stability of the insertion loss (forward direction loss) characteristics. This will be more concretely explained below.

The light that has been transmitted in the forward direction through the first birefringent region, Faraday rotator, and second birefringent region (percentage transmission k1, phase δ1) and the light that has been transmitted in the forward direction through the third birefringent region, Faraday rotator, and fourth birefringent region (percentage transmission k2, phase δ2)

travel straight as the phases are preset to be equal.

On the other hand, the light that has been transmitted through the fifth region, Faraday rotator, and sixth region (percentage transmission k3, phase δ3) is diffracted with a loss when the phases (optical path lengths) differ. When the percentage transmission of a light beam through the fifth and sixth regions is limited to 10% and when the refractive index (na) of the fifth and sixth regions is between the refractive indexes with respect to ordinary light (no) and extraordinary light (ne) of the birefringent regions, the resulting excess loss is at worst no more than 0.86 dB; practically the least necessary insertion loss of 1 dB or less can thus be realized.

This can be expressed by the following representation:

The transmissivity of the light traveling straight in the forward direction is $|\delta k1xe^{i\delta 1}+k2xe^{i\delta 2}+k1xe^{i\delta 3}|^2$. If k1=k2= 0.45, k3=0.1, and δ1=δ2, then the transmissivity is $|0.9+0.1xe^{i(\delta 3-\delta 1)}|^2$.

Assuming that the overall thickness of the birefringent regions and the fifth and sixth regions is d, $$\delta 3-\delta 1=2\Pi(2na-ne-no)d/\lambda.$$

From (1) above, however, |2(no−ne)d|=λ/2, and

When na=no or na=ne, |δ3−δ1|=Π/2 and the transmissivity=0.82, or the transmission loss is 0.86 dB.

When na is midway between no and ne, |δ3−δ1|≦Π/2 and the loss is ≦0.86 dB and, especially when na=(no+ne)/2, the loss=0 dB.

(3) above is concerned with a process for producing the composite optical element defined in (1).

FIGS. 2 through 8 illustrate the sequence of process steps for producing the composite optical element.

Figure 2:
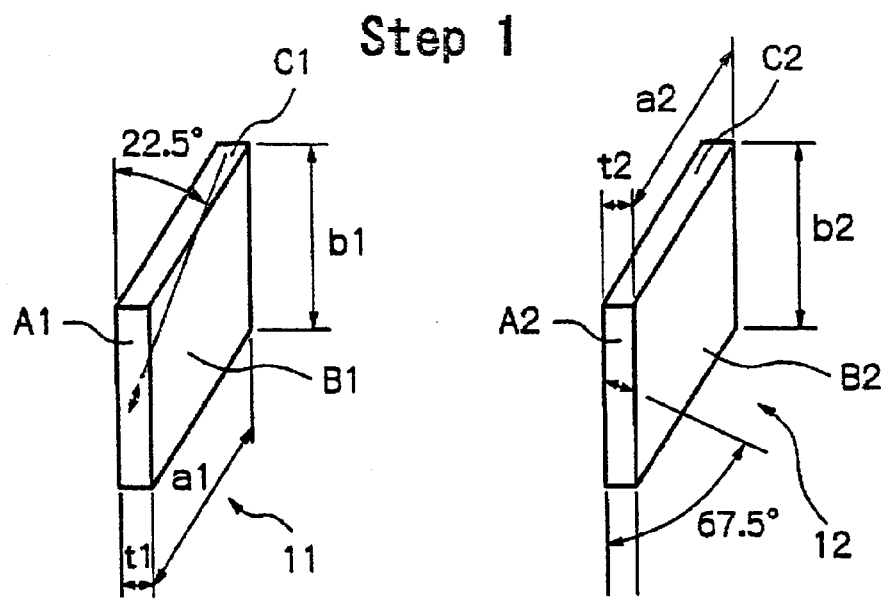
FIG. 2 shows views illustrating Step 1 of an exemplary process for manufacturing an optical isolator of the invention.

In Step 1 illustrated in FIG. 2, a plurality each of a first quartz plate 11 and a second quartz plate 12 are prepared. Their optical axes are along their planes A1 and A2. In the quartz plate 11 the angle its optical axis makes to the plane B1 is set to 22.5° and in the quartz plate 12 the angle its optical axis makes to the plane B2 is set to 67.5°. The two plates are made the same in thickness t1 and t2, height b1 and b2, and depth a1 and a2.

Figure 3:
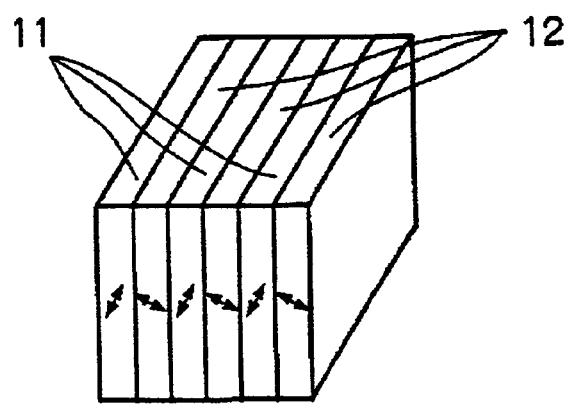
FIG. 3 is a view illustrating Step 2 of an exemplary process for manufacturing an optical isolator of the invention.

In Step 2 shown in FIG. 3, the pluralities of quartz plates 11 and 12 are joined, with the planes B1 and B2 face to face, to form a laminate. The plates are pressed altogether with an adequately strong pressure.

Figure 4:
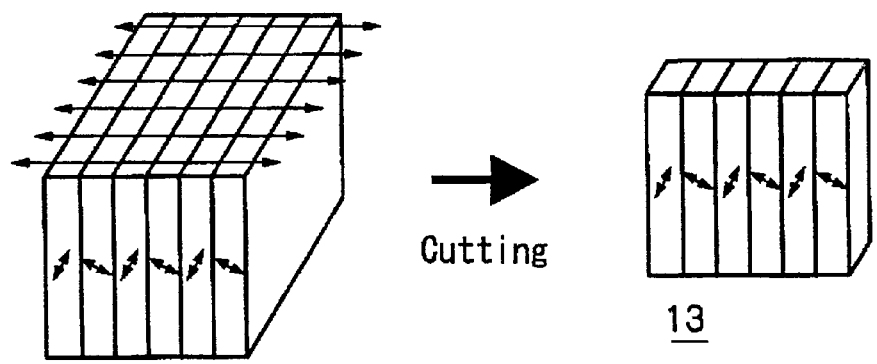
FIG. 4 is a view illustrating Step 3 of an exemplary process for manufacturing an optical isolator of the invention.

In Step 3 in FIG. 4, the block of quartz plate so laminated is cut along the lines shown with arrows in two directions into a plurality of composite elements 13 of a desired thickness each, each element having a cut surface parallel with the planes A1 and A2.

Figure 5:
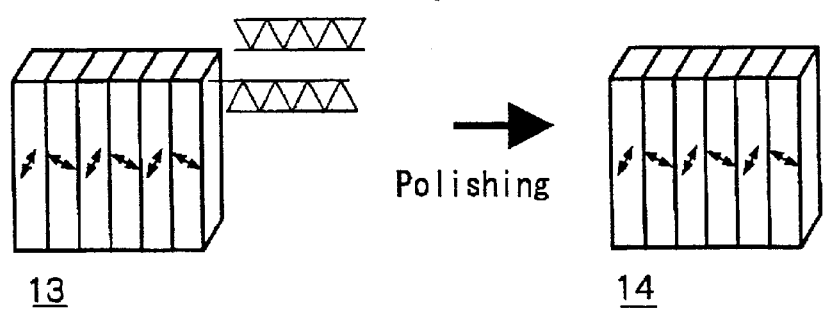
FIG. 5 is a view illustrating Step 4 of an exemplary process for manufacturing an optical isolator of the invention.

In Step 4 in FIG. 5, either at least one cut surface of the composite element 13 to be joined to a Faraday rotator or both cut surfaces are ground. The ground laminate is a composite element 14.

Figure 6:
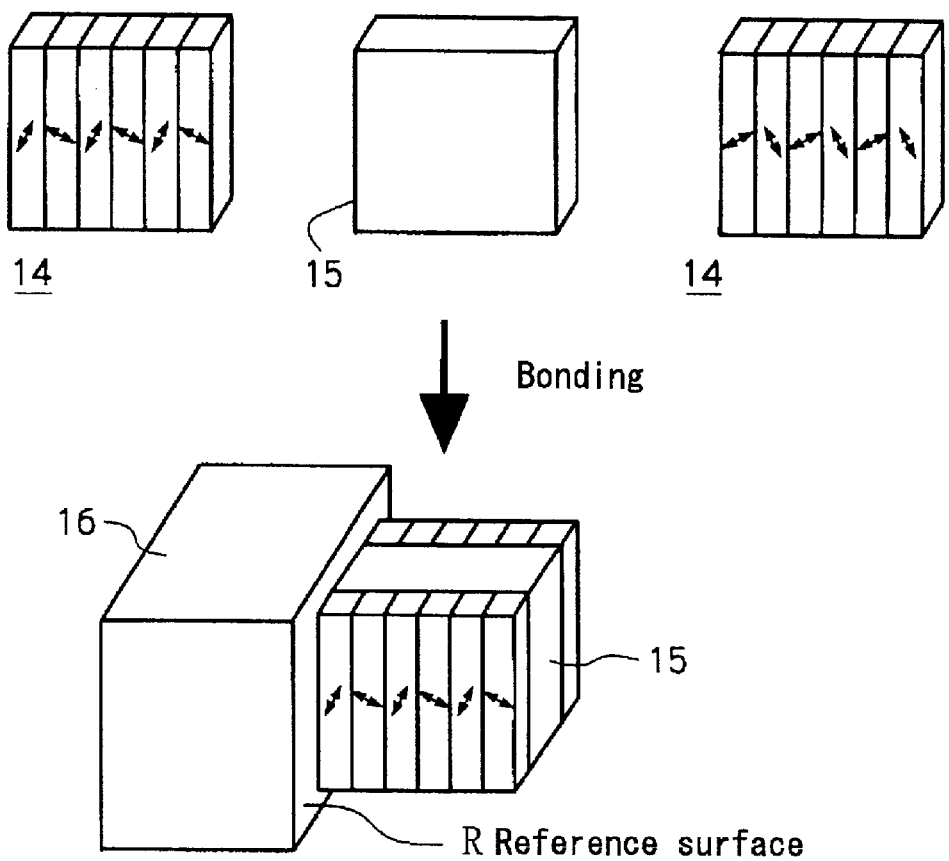
FIG. 6 is a view illustrating Step 5 of an exemplary process for manufacturing an optical isolator of the invention.

In Step 5 in FIG. 6. one composite element 14 and another composite element turned in the opposite direction are joined to a Faraday rotator 15 in between. Bringing the left end or right end of these elements in contact with a reference surface R of a jig 16 allows the composite elements to be aligned precisely.

In Step 6 shown in FIG. 7, the both planes of the composite optical elements 14, 14 joined to the Faraday rotator 15 in between are ground until the overall thickness reaches the designed thickness d.

In Step 7 shown in FIG. 8, the joined laminate is cut into pieces of desired dimensions so that each cut piece is a composite optical element 10 consisting of a Faraday rotator and a pair of composite elements joined to both sides of the rotator. Light beam comes into the element 10 as a spot extending over the first and second regions. Each such element 10 is diagrammatically shown on an enlarged scale as a front elevational view in (a) and as a side elevational view in (b) of FIG. 1.

Figure 1B:
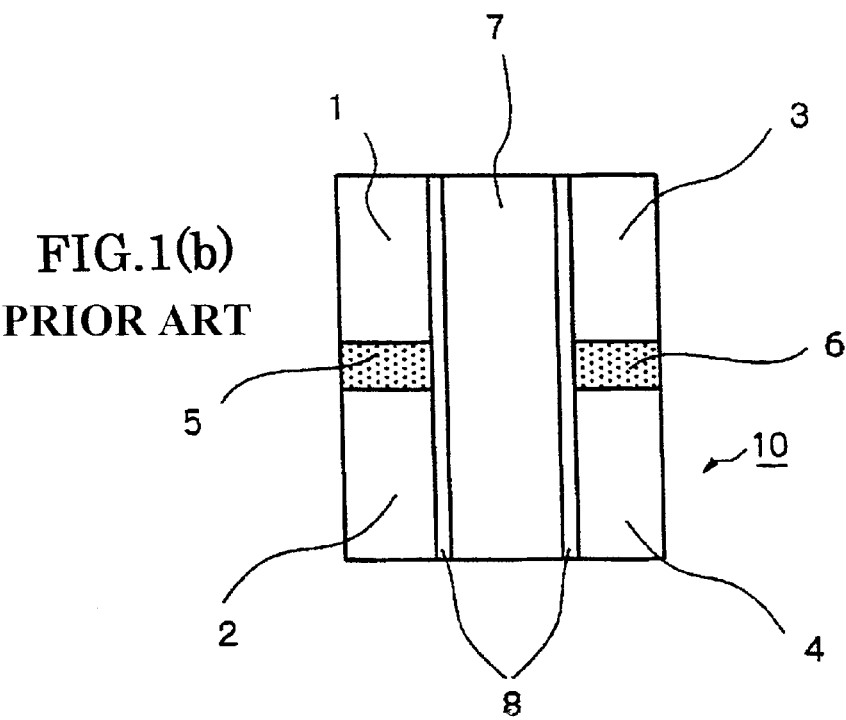

Turning to FIG. 1, the percentage of the light beam that is transmitted through the fifth and sixth regions is governed by the overall thickness of the adhesive layers used in joining the quartz plates 11 and 12 in Step 2. The thickness can be easily controlled through proper choice of factors such as the viscosity of the adhesive, and the degree of pressure that is applied for the joining purpose. The thickness can be reduced by using an adhesive of low viscosity and applying adequate pressure in joining. Thus the process that follows the sequence of steps illustrated in FIGS. 2 to 8 produces a number of the composite optical elements of (1) above in a stable manner.

The (4) above provides a process for producing the composite optical elements defined in (2) above.

To be more specific, in the process (3) above, the refractive index after curing of the adhesive joining quartz plates 11 and 12 is set to a value between the refractive index with respect to ordinary light and the refractive index with respect to extraordinary light of the birefringent regions. The refractive indexes of the fifth and sixth regions are thus made equal. For this reason composite optical elements of low forward direction loss can be stably manufactured.

The process (5) consists in setting the method of cutting and cut dimensions of quartz plates 11 and 12 as in Step 1 of FIG. 2, joining two composite elements 14, one of which being turned in the reverse direction, and joining them to both sides of a Faraday rotator, whereby the first and third birefringent regions, on one hand, and the second and fourth birefringent regions, on the other, are aligned respectively. In this way the number of components can be decreased.

In the process (6), as illustrated in Step 1 in FIG. 2, the thickness t1 of the quartz plate 11 and the thickness t2 of the quartz plate 12 are set to be strictly the same. This permits the use of composite optical elements without the need of any adjustment.

In the process (7), as represented by Step 2 in FIG. 3, the first birefringent region is joined to the second region and the third birefringent region to the fourth region without the use of adhesive but through optical contact. The optical contact is a phenomenon in which the planes B1 and B2 of the quartz plates 11, 12 to be mated can be joined by grinding and polishing the two plane surfaces with superprecision instead of relying on adhesive. The process makes it possible to realize an ideal composite optical element free from any unwanted region.

In (8) above, an optical isolator is made from one of the various composite optical elements according to the present invention. As illustrated in either FIG. 9 or 10, a permanent magnet 17 is disposed around a composite optical element 18 having two or more alternate regions of first and second birefringent regions and two or more alternate regions of third and fourth birefringent regions. (No such permanent magnet is required where the Faraday rotator is of a spontaneously magnetized material.) On both sides of the element are arranged a pair of collimator lenses 20, 20 and farther outwardly incident photometric fiber 19 and emergence photometric fiber 19 are arranged as aligned to each other.

Figure 11:
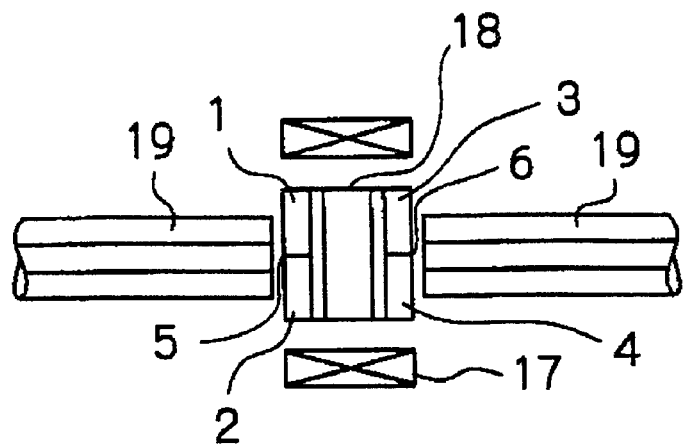
FIG. 11 is a view of still another application of an optical isolator according to the present invention.

In (9) above, an optical isolator is made from one of the various composite optical elements according to the present invention. As illustrated in FIG. 11, a permanent magnet 17 is disposed around a composite optical element 18 having two or more alternate regions of first and second birefringent regions and two or more alternate regions of third and fourth birefringent regions. (No such permanent magnet is required where the Faraday rotator is of a spontaneously magnetized material.) On both sides of the element are arranged a pair of collimator lenses 20, 20 as aligned to each other.

Figure 12A:
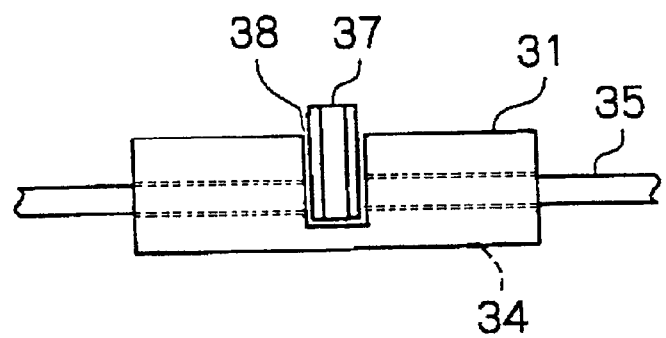
FIG. 12 shows views of an optical isolator of the invention fabricated as a capillary type.
Figure 12B:
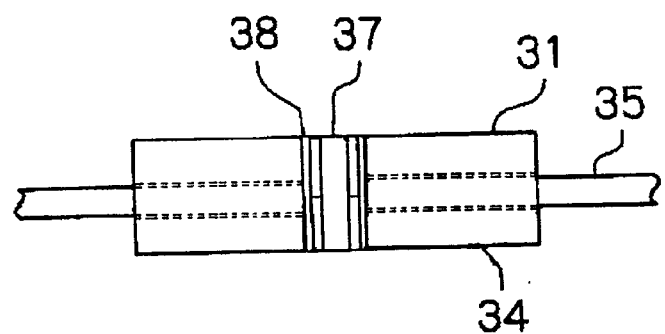

In (10) above, an optical isolator is made using one of the various composite optical elements according to the present invention. Here optical fibers are arranged inside a capillary formed in a substrate, and the composite optical component is disposed inside a groove formed in the capillary. Capillary types are taught in Japanese Patent Application Kokoku No. 7-109445 and Japanese Patent No. 2,683,266. An example of the type is illustrated in FIG. 12. FIG. 12($a$) is a side view and FIG. 12($b$) is a plan view. A capillary (fiber fixing member) 31 is a cylinder of a solid material such as glass or ceramic. While termed capillary here, it is also known as ferule. The capillary has an axial hole 35 [sic] in which optical fibers 35 are fitted and held in place. A groove 38 is formed across the optical fiber, and a composite optical element 36 according to the present invention is fitted into the groove and fixed securely with adhesive.

Figure 13:
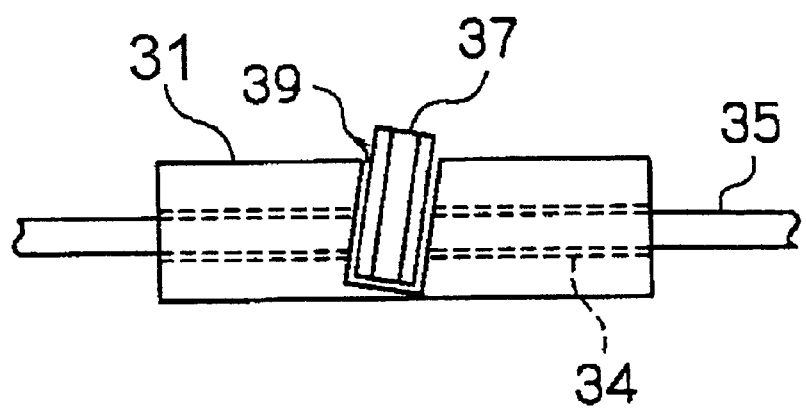
FIG. 13 shows views of an optical isolator of the invention fabricated as a capillary type, with a composite optical element located aslant with respect to an end of a fiber.
Figure 13:
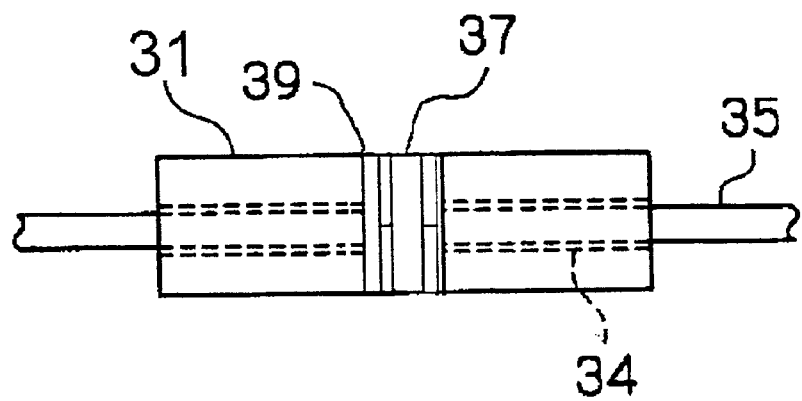

As another form of optical isolator according to the invention, as defined in (15) above, a composite optical element may be located with an inclination to the optical axis. FIG. 13 shows an example. The isolator in FIG. 13 has an inclined groove 39 with an inclination to the optical axis so as to prevent the return of light due to reflection at fiber ends that occurs in the isolator of FIG. 12, and a composite optical element 37 according to the invention is accommodated in the groove. FIG. 13($a$) is a side view and FIG. 13($b$) is a plan view.

(11) above is concerned with an optical attenuator.

An optical attenuator needs not have a fifth and a sixth regions. Preferably it uses a desirable one of the composite optical elements according to the invention and combines it with a means for applying a variable magnetic field to it.

Now the principles of an optical isolator will be explained. In an optical isolator:

It is assumed that the angle the optical axis of the first birefringent region makes to the optical axis of the third birefringent region is $\phi$ and the angle of Faraday rotation of a Faraday rotator is $\theta$.

Of the light incident to a composite optical element, polarized light travels as ordinary light through the first birefringent region and as extraordinary light through the second birefringent region. The proportion of the polarized light that passes as extraordinary light through the third birefringent region and as ordinary light through the fourth birefringent region is expressed as $\cos^2(\theta-\phi)$.

The length of the optical path through which the light has been transmitted through the first and third birefringent regions is set to be equal to the length of the optical path through which the light has been transmitted through the second and fourth birefringent regions. The polarized light, therefore, proceeds straight instead of being diffracted.

The proportion of the polarized light that travels as ordinary light through the third birefringent region and as extraordinary light through the fourth birefringent region is expressed as $\sin^2(\theta-\phi)$.

The length of the optical path through which the light has been transmitted through the first and third birefringent regions is set to be different by half wavelength from the length of the optical path through which the light has been transmitted through the second and fourth birefringent regions. The polarized light is, therefore, diffracted instead of proceeding straight.

Of the light incident to a composite optical element, polarized light travels as extraordinary light through the first birefringent region and as ordinary light through the second birefringent region. The proportion of the polarized light that passes as ordinary light through the third birefringent region and as extraordinary light through the fourth birefringent region is expressed as $\cos^2(\theta-\phi)$.

The length of the optical path through which the light has been transmitted through the first and third birefringent regions is set to be equal to the length of the optical path through which the light has been transmitted through the second and fourth birefringent regions. The polarized light, therefore, proceeds straight instead of being diffracted.

The proportion of the polarized light that travels as extraordinary light through the third birefringent region and as ordinary light through the fourth birefringent region is expressed as $\sin^2(\theta-\phi)$.

The length of the optical path through which the light has been transmitted through the first and third birefringent regions is set to be different by half wavelength from the length of the optical path through which the light has been transmitted through the second and fourth birefringent regions. The polarized light is, therefore, diffracted instead of proceeding straight.

After all, the transmissivity of light that is incident from one optical fiber to another optical fiber is, independent of the polarization of light, $\sin^2(\theta-\phi)$.

The angle $\theta$ of Faraday rotation can be made variable by turning the magnetic field being applied to the Faraday rotator variable. In this way the transmissivity or attenuation is made variable, and an optical attenuator independent of light polarization can thus be realized.

As the means for applying a magnetic field, electromagnet alone, combination of electromagnet and permanent magnet, and various other means may be used. Concrete magnetic field-applying means are disclosed in Japanese Patent No. 2,815,509 (optical attenuator), Patent Application Kokai No. 9-61770, etc.

The optical attenuator according to the present invention can be made small and compact and is less polarization-dependent than existing attenuators because it does not use a polarizer that varies the optical path with polarization.

By way of example, a bismuth-substituted rare earth iron-garnet film is used as a Faraday rotator, a magnetic field greater than saturation magnetic field is applied by a permanent magnet, as a magnetic field-applying means, in the direction perpendicular to the film, and means is provided for applying a magnetic field by an electromagnet in the inner planar direction of the film. At $\phi=100°$, the angle of saturated Faraday rotation is set to be $\theta s=100°$. When current is not flown through the electromagnet, $\theta=\theta s=100°$, and ideally the transmissivity is 1 and the attenuation is 0 dB. As the current through the electromagnet is increased, $\theta$ decreases below $100°$, and therefore the transmissivity declines while the attenuation increases. When $\theta=10°$, the attenuation is maximum (ideally it is infinite but actually it is restricted by other factors such as the quenching ratio of the element).

Figure 9:
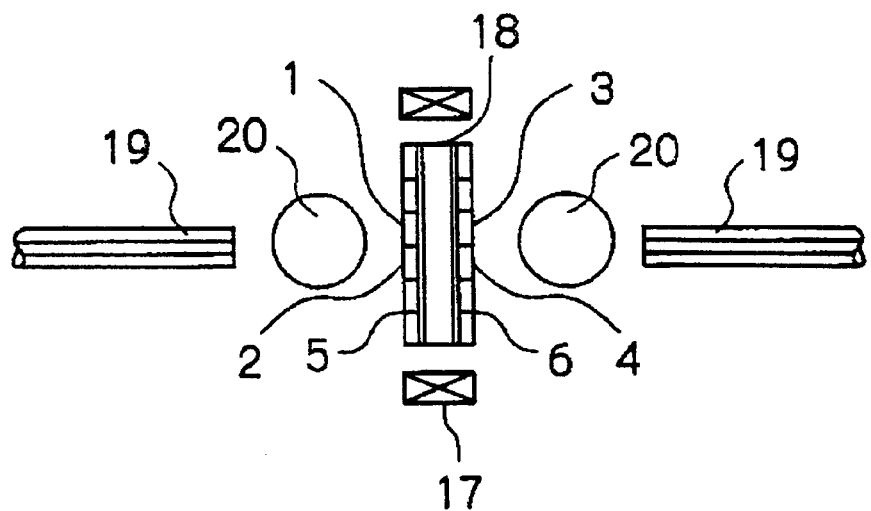
FIG. 9 is a view of exemplary application of an optical isolator according to the present invention.
Figure 10:
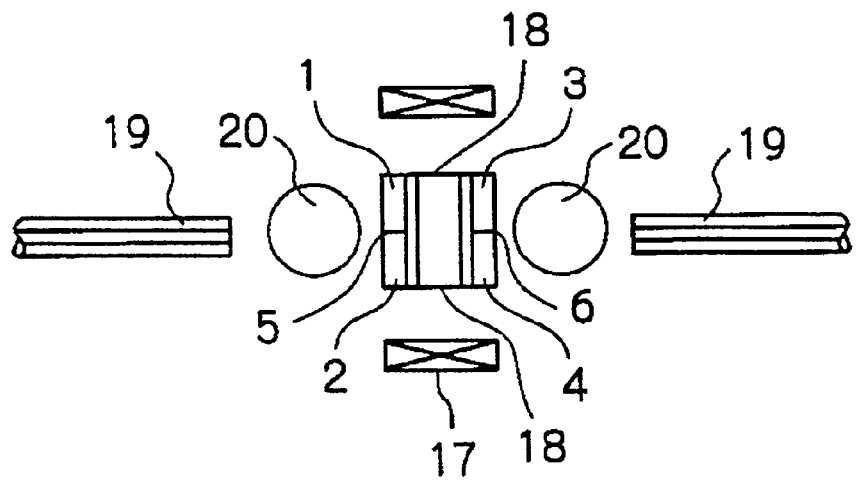
FIG. 10 is a view of another exemplary application of an optical isolator according to the present invention.

In practical application of the optical attenuator defined in (11) above, either lenses and optical fibers are arranged before and after a composite optical element for optical attenuation as in (12) above or optical fibers are arranged as in (13) above. In these arrangements, either collimator lenses and optical fibers are arranged as illustrated in FIGS. 9 and 10 in connection with an optical isolator or optical fibers are disposed as in FIG. 11. The only exception is that an electromagnet capable of flowing a variable current is employed in place of a permanent magnet as means for applying a magnetic field to the Faraday rotator.

In (14) above, an optical attenuator is made from one of the various composite optical elements according to the invention, by locating optical fibers in a capillary and disposing the composite optical component in a groove formed in the capillary, in the same manner as has been explained in connection with FIG. 12 showing an optical isolator.

Similarly, in a modified form of the optical attenuator of the invention, as in (16) above, the composite optical element may be located inclined with respect to its optical axis. An example of it is built in the same way as illustrated in FIG. 13 for optical isolator. The only exception is that an electromagnet capable of producing a variable magnetic field is employed as the magnet.

Examples of optical isolators utilizing inclined incident light as defined in (17) and (18) above will now be explained with reference to FIG. 14 (Comparative Example) and FIG. 15 (This invention). In both figures, (a) is a side elevational view and (b) is a plan view.

Figure 14:
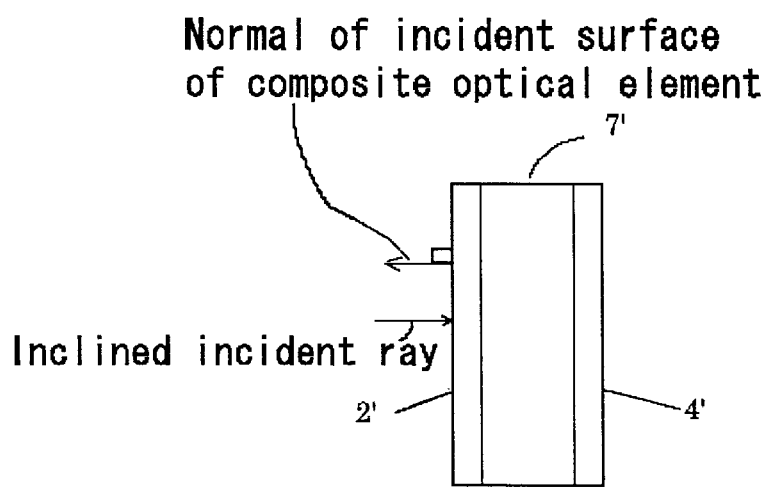
FIG. 14 are views comparing optical isolators with inclined incident light.
Figure 14:
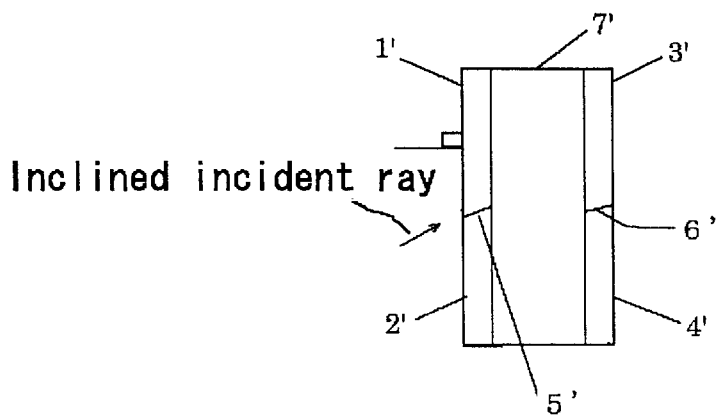

When the plane including the vector of inclined incident light and the normal vector of incident surface of the composite optical element is not parallel to the interfacial boundary between the first and second birefringent regions 1', 2' as in FIG. 14, the light travels while being diffracted through the composite optical element. For this reason the interfacial boundary between the first and second birefringent regions 1', 2' and that between the third and fourth birefringent regions 3', 4' must be shifted with respect to each other rather than be on the same plane. Moreover, the interfacial boundaries too must be inclined to a precise degree.

In the optical isolator according to the present invention, therefore, the plane including the vector of inclined incident light and the normal vector of the incident surface of the composite optical element is set to be parallel to the interfacial boundary between the first and second birefringent regions 1, 2. The setting enables the light to move straight in the composite optical element as in FIG. 15(b) whereas it is diffracted in the element in FIG. 15(a). The light that has passed the first and second birefringent regions 1, 2 can farther travel, respectively, through the third and fourth birefringent regions. Thus the interfacial boundary between the first and second birefringent regions 1, 2 and that between the third and fourth birefringent regions 3, 4 have only to be parallel to each other, whereby the manufacture of the composite optical elements is facilitated.

Figure 16:
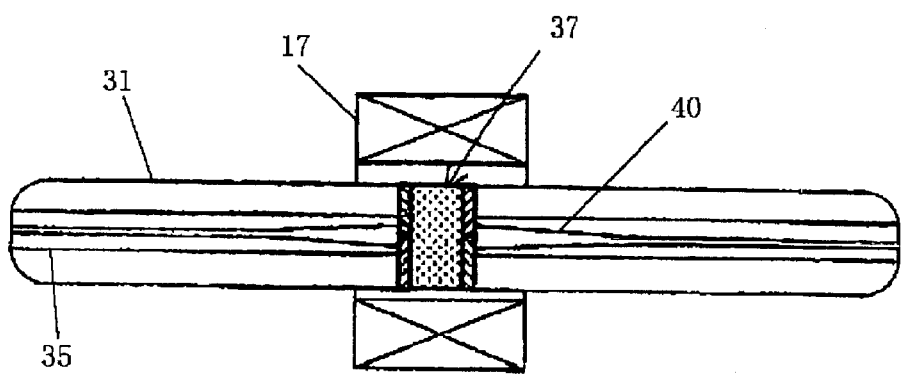
FIG. 16 is a view illustrating a capillary type optical isolator according to the present invention.

FIG. 16 shows an embodiment of the capillary type optical isolator of the invention using optical fibers each having a core bulge in the vicinity of a composite optical element. The arrangement enhances the efficiency of optical utilization of the first to fourth birefringent regions of the composite optical element. In FIG. 16, optical fibers having a core bulge 40 each are inserted into the hollow of a capillary 31, and the composite optical element 37 of the invention is sandwiched between the bulges. A permanent magnet 17 is held around the composite optical element.

Figure 15:
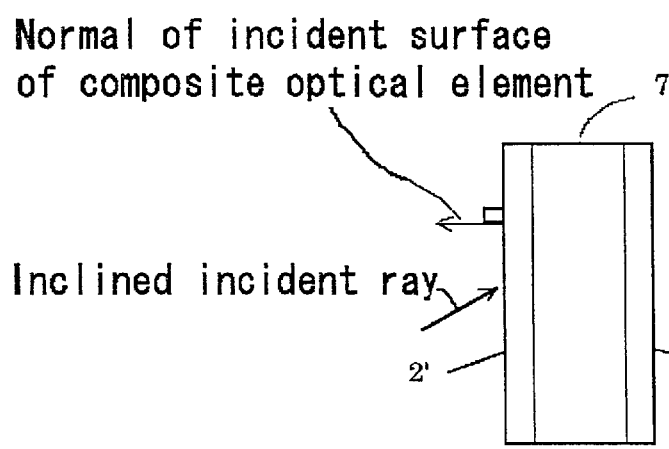
FIG. 15 shows views of an optical isolator of the invention suited for inclined incident light.
Figure 15:
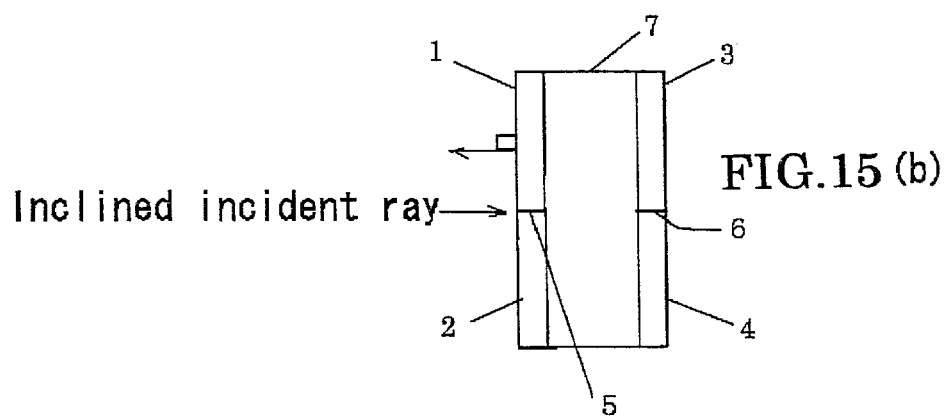

The optical attenuators that utilize inclined incident light as defined in (19), (20) above can adopt the construction illustrated in FIG. 15 for (17), (18).

Figure 17:
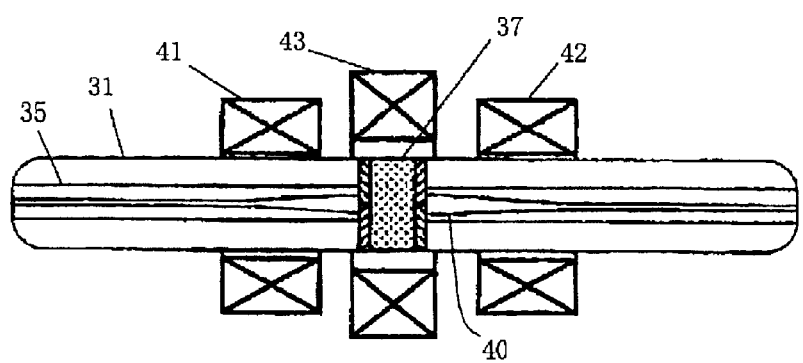
FIG. 17 is a view illustrating a capillary type optical attenuator according to the present invention.

FIG. 17 shows an embodiment of the capillary type optical attenuator of the invention using optical fibers each having a core bulge in the vicinity of a composite optical element. The arrangement enhances the efficiency of optical utilization of the first to fourth birefringent regions of the composite optical element. In FIG. 17, optical fibers having a core bulge 40 each are inserted into the hollow of a capillary 31, and the composite optical element 37 of the invention is sandwiched between the bulges. An optical-attenuator magnetic circuit comprising an electromagnet 43 capable of applying a variable magnetic field and a pair of permanent magnets 41, 42 located before and after the electromagnet is provided around the composite optical element.

A concrete example of the invention will be described below.

CONCRETE EXAMPLE

Typical compositions of composite optical element and optical isolator fabricated by the sequence of process steps thus far illustrated in FIGS. 2 to 8 will now be explained.

Step 1

Many quartz plates 11, 12 each measuring 10 mm×11 mm×1.7 mm (a×b×t) were prepared. Other details are as shown in Step 1 that has already been explained with reference to FIG. 2.

Step 2

Using an optical adhesive of low viscosity, quartz plates 11 and 12 were alternately placed with their side B facing the same direction and then joined under a sufficiently large pressure. The thickness of each adhesive layer was 1 μm or less. The refractive index of the adhesive after curing was 1.532. (Although technical difficulties are involved, optical contact may be used in joining instead of using the adhesive, as already explained.)

Step 3

The quartz plate laminate thus joined into a mass was cut into pieces each measuring 0.8 mm in thickness, with the cut surface parallel to the plane A. A total of 11 composite elements 3 were thus obtained.

Step 4

Each element was ground and polished on both sides to a thickness of 0.6 mm, and a composite element 4 was obtained.

Step 5

As a Faraday rotator, a bismuth-substituted rare earth iron-garnet with an angle of Faraday rotation of 45° was used. The Faraday rotator measured 10×10×0.4 mm thick. Out of two same composite elements 4, one was turned from side to side and the two elements were joined to the both sides of the Faraday rotator.

Step 6

The both sides of the laminate were ground and polished until each of the composite element portions joined to the Faraday rotator was 46 μm thick.

Step 7

The laminate was cut into pieces each with dimensions of about 1.5 mm×1.5 mm (as seen in the direction of its optical axis) so that composite optical elements each of which combines a Faraday rotator and two composite elements could be obtained.

Each composite optical element thus fabricated was combined with a permanent magnet, and the combination was arranged with a parallel beam system composed of two aligned single-mode optical fibers 19, 19 and two lenses 20, 20 as illustrated in FIG. 10. The optical isolator characteristics of the arrangement were determined to be 0.1 db insertion loss and 30 dB isolation. The product was confirmed to function as a polarization-independent, polarization-dispersion-free optical isolator. A similarly fabricated composite optical element was combined with an electromagnet, and a magnetic field applied to a Faraday rotator was changed. The amount of transmitted light varied, and the combination was confirmed to work normally as an optical attenuator.

With the composition described above, the present invention achieves the following advantageous effects.

(1) Ideal composite optical elements in which the proportions and refractive indexes of the fifth and sixth regions are controlled so that the optical characteristics are stabilized, and optical devices such as optical isolators and attenuators using the elements can be realized.

(2) In accordance with the process of the invention the composite optical elements (1) above can be manufactured with good reproducibility and stability.

Furthermore, the process of the invention offers the following additional advantages.

(3) Each element may be made of only two rather than four of birefringent plates. (This corresponds to (5) above.)

(4) The positions of the regions on both sides can be determined without adjustment. (This corresponds to (6) above.)

Only if the thicknesses of the quartz plates 11, 12 are precisely predetermined, the both side regions can be automatically decided at the time of joining in Step 5.

(5) Even in the case of inclined light incidence, an element in which the interfacial boundary between the first and second regions and that between the third and fourth regions are in the same plate can be used. This facilitates the manufacture of the elements.

What we claim is:

1. A composite optical element comprising a Faraday rotator, a first birefringent region, a second birefringent region, and a fifth region, wherein all said first, second and fifth regions are joined to one plane of said rotator, and a third birefringent region, a fourth birefringent region, and a sixth region, wherein all said third, fourth and sixth regions are joined to the opposite plane of said rotator, and wherein:

light transmitted through the first birefringent region passes through the third birefringent region;

light transmitted through the second birefringent region passing through the fourth birefringent region;

the optical axis of the first birefringent region and the optical axis of the second birefringent region intersect orthogonally;

the optical axis of the third birefringent region and the optical axis of the fourth birefringent region intersect orthogonally;

the principal planes of both the first and second birefringent regions have the same ground surfaces;

the principal planes of both the third and fourth birefringent regions have the same ground surfaces;

the first, second, third, and fourth birefringent regions are of the same material; and the percentage of travel of the light beam through the fifth and six regions is no more than 10%.

2. An element according to claim 1, wherein the refractive indexes of the fifth and sixth regions have values between the refractive indexes of the birefringent regions with respect to ordinary light and extraordinary light.

3. A process for producing a composite optical element winch comprises joining a plurality of a first birefringent plates and a plurality of a second birefringent plates alternately with adhesive to form a laminate;

joining numbers of third and fourth birefringent plates alternately with adhesive to farm a laminate; and cutting the laminates into pieces each of which is the composite optical element of claim 1, wherein the joints formed using the adhesive constituting a fifth and a sixth regions.

4. A process according to claim 3, wherein the refractive index of the adhesive used in alternately joining the birefringent plates into a laminate has a value between the refractive indexes of the birefringent material with respect to ordinary light and extraordinary light.

5. A process according to claim 3, wherein only two different birefringent plates are used to form the laminate of the first and second birefringent plates and the laminate of the third and fourth birefringent plates.

6. A process according to claim 3, wherein the positional relations of the four different birefringent regions can be decided without adjustment, through control of the thickness of the birefringent plates to be the same.

7. An optical isolator comprising a composite optical element according to claim 1 or 2, the optical axis of the first birefringent region in the element being at an angle of approximately 45° to the optical axis of the third birefringent region, and at least one lens and one optical fiber arranged on each of the two sides of the composite optical element.

8. An isolator according to claim 7, wherein said composite optical element is located as inclined to the optical axis of incident light.

9. An isolator according to claim 8, wherein said composite optical element is located as inclined to the optical axis of the incident light, and
the plane including said optical axis and normal of the plane of incidence of said composite optical element is parallel to the interfacial boundary between said first and second birefringent regions.

10. An isolator according to claim 9, wherein the interfacial boundary between said first and second birefringent regions and
the interfacial boundary between said third and fourth birefringent regions are on the same plane.

11. An optical isolator comprising a composite optical element according to claim 1 or 2, the optical axis of the first birefringent region in the element being at an angle of approximately 45° to the optical axis of to third birefringent region, and at least one optical fiber arranged on each of the two sides of the composite optical element.

12. An isolator according to claim 11, wherein the optical fibers are arranged in a capillary and the composite optical element is fitted in a groove formed in the capillary.

13. An isolator according to claim 12, wherein said composite optical element located as inclined to the optical axis of incident light.

14. An isolator according to claim 11, wherein said composite optical element is located as inclined to the optical axis of incident light.

15. An optical attenuator comprising a composite optical element according to claim 1 or 2, a magnetic field-applying means, and at least one lens and one optical fiber arranged on each of the two sides of said composite optical element.

16. An attenuator according claim 15, wherein said composite optical element is located as inclined to the optical axis of incident light.

17. An optical attenuator comprising a composite optical element according to claim 1 or 2, a magnetic field-applying means, and at least one optical fiber arranged on each of the two sides of said composite optical element.

18. An attenuator according to claim 17, wherein the optical fibers arc arranged in a capillary and the composite optical element is fitted in a groove formed in the capillary.

19. An attenuator according to claim 18, wherein said composite optical element is located as inclined to the optical axis of incident tight.

20. An attenuator according to claim 17, wherein said composite optical element is located as inclined to the optical axis of incident light.

21. An optical attenuator comprising a composite optical element and magnetic field-applying means, said optical element comprising a Faraday rotator, a first birefringent region and a second birefringent region joined to one plane of said rotator, and a third birefringent region and a fourth birefringent region joined to the opposite plane of said rotator, wherein:
light transmitted through to first birefringent region passes through the third birefringent region;
light transmitted through the second birefringent region passes through the fourth birefringent region;
the optical axis of the first birefringent region and the optical axis of the second birefringent region intersect orthogonally;
the optical axis of the third birefringent region and the optical axis of the fourth birefringent region intersect orthogonally;
the principal planes of both to first and second birefringent regions have the same ground surfaces;
the principal planes of both the third and fourth birefringent regions have to same ground surfaces;
the first, second, third, and fourth birefringent regions are of the same material; and
said magnetic field-applying means is one capable of applying a variable magnetic field to said Faraday rotator.

22. An attenuator according to claim 21, which further comprises at least one lens and one optical fiber arranged on each of the two sides of said composite optical element.

23. An attenuator according to claim 22, wherein said composite optical element is located as inclined to the optical axis of incident light.

24. An attenuator according to claim 21, which further comprises at least one optical fiber arranged on each of the two sides of said composite optical element.

25. An attenuator according to claim 24, wherein said composite optical element is located as inclined to the optical axis of incident light.

26. An attenuator according to claim 21, wherein the optical fibers are arranged in a capillary and the composite optical element is fitted in a groove formed in the capillary.

27. An attenuator according to claim 26, wherein said composite optical element located as inclined to the optical axis of incident light.

28. An attenuator according to claim 21, wherein said composite optical element is located as inclined to the optical axis of incident light.

29. An attenuator according to claim 28, wherein
said composite optical element is located as inclined to the optical axis of incident light, and
the plane including said optical axis and normal of the plane of incidence of said composite optical element is parallel to the interfacial boundary between said first and second birefringent regions.

30. An attenuator according to claim 29, wherein
the interfacial boundary between said first and second birefringent regions and
the interfacial boundary between said third and fourth birefringent regions are on the same plane.

31. A composite optical element comprising a Faraday rotator, a first birefringent region and a second birefringent region joined to one plane of said rotator, and a third birefringent region and a fourth birefringent region joined to the opposite plane of said rotator,
the light that has been transmitted through the first birefringent region passing through the third birefringent region,
the light that has been transmitted through the second birefringent region passing through the fourth birefringent region,
the optical axis of the first birefringent region and that of the second birefringent region intersecting orthogonally,
the optical axis of the third birefringent region and that of the fourth birefringent region intersecting orthogonally,
the principal planes of both the first and second birefringent regions having the same ground surfaces, the principal planes of both the third and fourth birefringent regions having the same ground surfaces, the first, second, third, and fourth birefringent regions being of the same material, the first and second birefringent regions and the third and fourth birefringent regions are each joined by optical contact, the optical axis of the first birefringent region in the element being at an angle of approximately 45° to the optical axis of the third birefringent region, and at least one optical fiber arranged on each of the two sides of the composite optical element, and the optical fibers being ranged in a capillary and the composite optical element is fitted in a groove formed in the capillary.

32. A composite optical element comprising a Faraday rotator, a first birefringent region and a second birefringent region joined to one plane of said rotator, and a third birefringent region and a fourth birefringent region joined to the opposite plane of said rotator, the light that has been transmitted through the first birefringent region passing through the third birefringent region, the light that has been transmitted through the second birefringent region passing through the fourth birefringent region, the optical axis of the first birefringent region and that of the second birefringent region intersecting orthogonally, the optical axis of the third birefringent region and that of the fourth birefringent region intersecting orthogonally, the principal planes of both the first and second birefringent regions having the same ground surfaces, the principal planes of both the third and fourth birefringent regions having the same around surfaces, the first, second, third, and fourth birefringent regions being of the same material, the first and second birefringent regions and the third and fourth birefringent regions are each joined by optical contact, the optical axis of the first birefringent region in the element being at an angle of approximately 45° to the optical axis of the third birefringent region, and at least one lens and one optical fiber arranged on each of the two sides of the composite optical element, said composite optical element being located as inclined to the optical axis of incident light, wherein the optical fibers are arranged in a capillary and the composite optical element is fitted in a groove formed in the capillary.

* * * * *